United States Patent [19]

Makam

[11] Patent Number: 5,699,362
[45] Date of Patent: Dec. 16, 1997

[54] SYSTEM AND METHOD FOR DIRECT OUTPUT OF CONSTANT RATE HIGH BANDWIDTH PACKETS STREAMS FROM LONG TERM MEMORY DEVICES

[75] Inventor: Srinivas V. Makam, Naperville, Ill.

[73] Assignee: Lucent Technologies Inc., Murray Hill, N.J.

[21] Appl. No.: 420,887

[22] Filed: Apr. 11, 1995

Related U.S. Application Data

[63] Continuation of Ser. No. 175,877, Dec. 30, 1993, abandoned.

[51] Int. Cl.$^6$ .......................................... H04J 3/16
[52] U.S. Cl. .................. 370/437; 370/431; 370/436; 348/7; 395/200.09
[58] Field of Search ................................. 395/427, 855, 395/200.09; 370/94.1, 60, 431, 437, 436; 348/7

[56] References Cited

U.S. PATENT DOCUMENTS

| | | | |
|---|---|---|---|
| 4,413,317 | 11/1983 | Swenson | 395/441 |
| 4,891,805 | 1/1990 | Fallin | 370/229 |
| 5,016,165 | 5/1991 | Tanikawa | 395/842 |
| 5,023,829 | 6/1991 | Shibata | 395/853 |
| 5,047,927 | 9/1991 | Sowell et al. | 395/200.07 |
| 5,083,269 | 1/1992 | Syobatake et al. | 395/427 |
| 5,130,984 | 7/1992 | Cisneros | 370/399 |
| 5,185,694 | 2/1993 | Edenfield et al. | 395/287 |
| 5,193,169 | 3/1993 | Ishikawa | 395/842 |
| 5,206,933 | 4/1993 | Farrell et al. | 395/200.2 |
| 5,218,680 | 6/1993 | Farrell et al. | 395/200.06 |
| 5,247,347 | 9/1993 | Litteral et al. | 348/7 |
| 5,301,280 | 4/1994 | Schwartz et al. | 395/200.12 |
| 5,321,816 | 6/1994 | Rogan et al. | 395/242 |
| 5,333,291 | 7/1994 | Grunbok et al. | 395/484 |
| 5,335,325 | 8/1994 | Frank et al. | 395/490 |
| 5,341,488 | 8/1994 | Kobayashi | 395/405 |
| 5,363,484 | 11/1994 | Desnoyers et al. | 395/200.07 |
| 5,396,494 | 3/1995 | Roposh | 370/439 |
| 5,481,312 | 1/1996 | Cash et al. | 348/845.2 |
| 5,570,355 | 10/1996 | Dail et al. | 370/352 |
| 5,594,727 | 1/1997 | Kolbenson et al. | 370/442 |
| 5,608,725 | 3/1997 | Grube et al. | 370/338 |

FOREIGN PATENT DOCUMENTS

WO91/08630  6/1991  WIPO ................. H04J 3/24

OTHER PUBLICATIONS

"The Next Big Info Tech Battle", by Alan Deutschman. *Fortune*, Nov. 29, 1993, pp. 39–50.

Primary Examiner—William M. Treat
Assistant Examiner—Kenneth R. Coulter
Attorney, Agent, or Firm—Michael B. Johannesen

[57] ABSTRACT

An apparatus that retrieves data from a plurality of long-term memory devices and delivers the data to a packet network over a plurality of channels, wherein each of the channels has a specific bandwidth requirement. The apparatus comprises a storage device adaptor which is connected to the long-term storage devices (such as disk systems, CD ROM, etc.). The adaptor reads data responsive to a selected channel from a storage device to a location in a buffer memory. A network interface reads data from the location in the buffer memory, formats the data, and sends the data to the packet network. A controller selects the channel in such a way that all channels receive their required bandwidth. The controller includes a table having a plurality of entries, wherein each entry may contain a channel identification. All channels have at least one entry in the table, and channels that require more bandwidth have multiple entries in the table.

4 Claims, 4 Drawing Sheets

TIME SLOT TABLE  400

| | 0 | 1 | 2 | 3 |
|---|---|---|---|---|
| | CH 1 | | | |
| | | CH 2 | | |
| | CH 7 | | | |
| | CH 7 | | CH 2 | |
| | CH 7 | | | |
| | CH 7 | CH 3 | CH 3 | CH 3 |
| | ⋮ | ⋮ | ⋮ | ⋮ |
| | | CH 6 | | |
| | | | | |
| | P-3 | P-2 | P-1 | P |

FIG. 4
TIME SLOT TABLE

400

| | 0 | 1 | 2 | 3 |
|---|---|---|---|---|
| | CH 1 | | | |
| | | CH 2 | | |
| | CH 7 | | | |
| | CH 7 | | CH 2 | |
| | CH 7 | | | |
| | CH 7 | CH 3 | CH 3 | CH 3 |
| | ⋮ | ⋮ | ⋮ | ⋮ |
| | | CH 6 | | |
| | | | | |
| | P-3 | P-2 | P-1 | P |

FIG. 5

| | CHANNEL STATUS | CHANNEL TYPE | BUFFER STATUS | READ POINTER | END POINTER | AAL SEQUENCE |
|---|---|---|---|---|---|---|
| 1 | ACTIVE | | | | | 3 |
| 2 | PAUSE | | | | | 0 |
| 3 | ACTIVE | | | | | 2 |
| 4 | IDLE | | | | | |
| 5 | STOP | | | | | 1 |
| 6 | IDLE | | | | | |
| ⋮ | ⋮ | ⋮ | ⋮ | ⋮ | ⋮ | ⋮ |
| 128 | IDLE | | | | | |

SYSTEM AND METHOD FOR DIRECT OUTPUT OF CONSTANT RATE HIGH BANDWIDTH PACKETS STREAMS FROM LONG TERM MEMORY DEVICES

This application is a continuation of application Ser. No. 08/175,877, filed on Dec. 30, 1993, now abandoned.

TECHNICAL FIELD

This invention relates to the field of maximizing input/output rate from long-term computer memory, and, more specifically to the area of directly providing input/output to/from long-term memory devices without the data moving through a central processor and main memory.

BACKGROUND OF THE INVENTION

A computer system generally comprises a central processor, an input/output interface, multiple input/output devices (keyboards, monitors, printers, etc.) and a memory system. The central processor uses the memory system to store programs and data used by such programs. According to current computer theory, memory systems are hierarchically organized; that is, data that is accessed frequently is stored in high speed memory (i.e. cache), less frequently accessed data is stored in main memory (random access memory or RAM), and infrequently accessed data is stored in low speed memory, such as hard disks or floppy disks, and now also includes devices such as CD ROMS and digital tape.

In this hierarchy, data that is stored on disk or other long term storage devices is copied by the central processor unit (CPU) into main memory for use. Data that is stored on long-term devices can also be transferred out of the computer system, but generally passes through main memory under the control of the CPU. Even with direct memory access (DMA) transfer of data into or out of main memory, the system "steals cycles" from the CPU because the CPU cannot access memory during the time the DMA access is taking place. This movement of data is a relatively slow task, wherein the CPU typically is the bottleneck, but is sufficient for most interactive computer programs and for dedicated transfer of data systems such as audio or video disks.

A further data flow bottleneck in transferring data in computer systems is the input/output (I/O) interface device. An I/O interface device is generally a centralized system through which all data going into or out of the CPU and main memory must pass. All data going to the outside world from the disk system must first go to the main memory through the I/O device, and from main memory through the I/O device to the outside world.

A new application requiring transfer of massive amounts of data from large, long-term memory systems is video-on-demand. In video-on-demand, a consumer orders a movie or other program, and the system responds by delivering the program to the consumer. Such programs will be delivered to a set top box converter in digital form, and the set top box will transform the programs into analog input for a television set. Since the programs are stored in digital form, they are stored on a large computer memory system comprising media such as CD ROMs, computer disks, large arrays of RAM, and/or digital tape. Multiple showings of each program will be available and each consumer can view each available program from the beginning at different times. Therefore, each media must be capable of reading multiple locations in the same program, and delivering each program simultaneously.

Building a video-on-demand system using the hierarchy of the prior art requires moving data from the storage medium through the I/O system to main memory where the data is formatted for transmission to the consumer. The data is then sent back through the I/O system to a network interface. A system that can read from multiple storage media and multiple locations from each media simultaneously as required in a video-on-demand system requires a very fast processor, very high speed main memory and a complex I/O system. Moving all of the data from the storage media through the I/O device into memory and then out through the I/O device to a plurality of destinations requires multiple operations occurring simultaneously, and may also require several operations on the same data in order to send the same program to several different locations. Furthermore, the computer also must take orders from the subscriber, record billing information, monitor the subscriber for signaling to stop, rewind, fast forward or change the program. All of these simultaneous functions require that the CPU not lose cycles or have massively parallel processing.

A further problem in construction of video-on-demand systems is that each program has an individual bandwidth requirement that is not the same as other programs. For example, a black and white movie with monophonic sound requires less data and, hence, a narrower bandwidth than a modern blockbuster color movie with stereophonic (or enhanced stereophonic) sound. The greater the bandwidth the less other processing (such as order taking) the CPU can perform because the CPU, main memory, and the I/O device are occupied by transferring data.

Therefore, a problem in the an is that there is no system for transferring large amounts of data with varying bandwidth requirements from long-term memory to the outside devices without data being moved into main memory by the central processor.

SUMMARY OF THE INVENTION

This problem is solved and a technical advance is achieved in the art by a system and method for delivering the output from a long term memory device such as hard disk, CD ROM, etc., directly to its destination without passing first through a central processor, main memory, or a centralized I/O system. An apparatus according to this invention retrieves data form a plurality of long-term memory devices and delivers the data to a packet network over a plurality of channels, wherein each of the channels requires a specific bandwidth. The apparatus comprises a storage device adaptor which is connected to the long-term storage devices (such as disk systems, CD ROM, etc.). The adaptor reads data responsive to a selected channel from a storage device and delivers the data to a location in a buffer memory. A network interface reads data from the location in the buffer memory, formats the data, and sends the data to the packet network responsive to the selected channel. A controller selects the channel in such a way that all channels receive their required bandwidth. Advantageously, the controller includes a table having a plurality of entries, wherein each entry may contain a channel identification. All channels have at least one entry in the table, and channels that require more bandwidth have multiple entries in the table. The controller sequentially visits each entry in the table and selects the channel contained in the entry. Thus, all data flows through this apparatus without involving the CPU, main memory or central I/O device, freeing up the CPU for order taking, billing, and other tasks. Furthermore, each channel of data can have its own bandwidth requirements without interfering with the operation of the CPU.

A further apparatus according to this invention provides video-on-demand. This apparatus receives subscriber signaling indicating a desired program (or other command controlling the program). One or more content storage units receive this signaling and respond accordingly. Primarily, the content storage units read data from one or more long-term memory devices, format the data for transmission over the packet network, and send the data on the packet network. Advantageously, each content storage unit includes a storage device adapter, a buffer and a network interface. The storage device adapter reads data from the storage devices for a selected channel and moves the data into the buffer. The network interface reads the buffer at a location where data for the selected channel is stored, formats the data for transport on the packet network, and sends the data on the packet network. Advantageously, there is a controller in the content storage unit that selects the channel. The controller includes a table having a plurality of entries, wherein each entry may contain a channel identification. All channels have at least one entry in the table, and channels that require more bandwidth have multiple entries in the table. The controller sequentially visits each entry on the table and selects the channel contained in the entry. Thus, a video-on-demand apparatus may be realized that does not have multiple operations to read data into main memory through an I/O device, format the data in main memory and then send the data back out through the I/O device.

BRIEF DESCRIPTION OF THE DRAWING

A more complete understanding of the invention may be obtained from consideration of the following description in conjunction with the drawings in which:

FIG. 4 is an exemplary time slot table as used by the content storage unit of FIG. 2 according to an exemplary embodiment of this invention; and FIG. 5 is an exemplary channel descriptor table as used by the content storage unit of FIG. 2 according to an exemplary embodiment of this invention.

DETAILED DESCRIPTION

Figure 1:
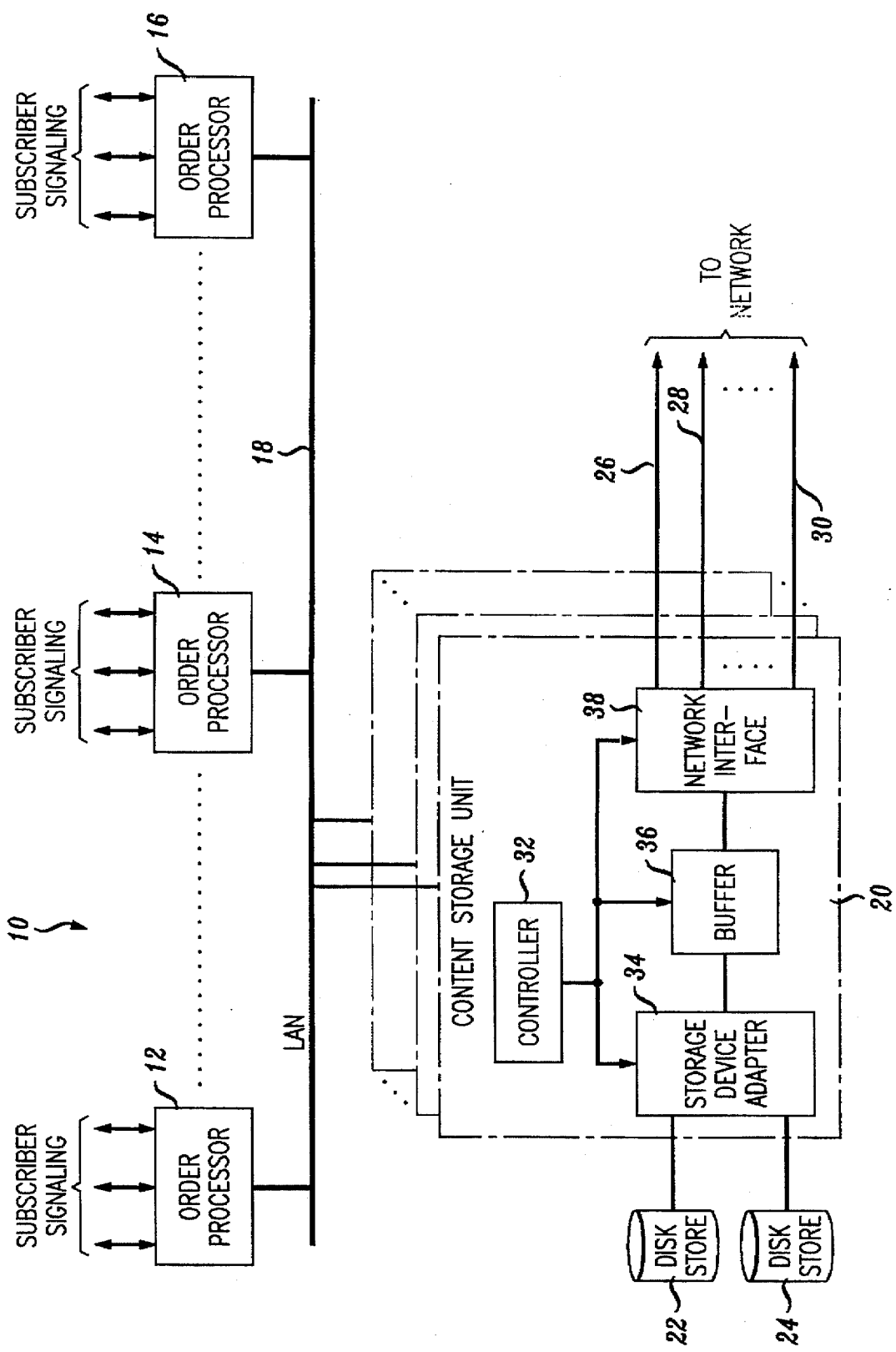
FIG. 1 is a block diagram of an exemplary embodiment of an interactive video server which directly transfers data from long-term memory devices to network interfaces according to an exemplary embodiment of this invention.

FIG. 1 shows an interactive video server 10 according to an exemplary embodiment of this invention, which can directly move data from long-term memory devices without routing retrieved data through a central I/O device or main memory, or stealing CPU cycles. Interactive video server 10 provides video programs (i.e., movies or other programmatic material) to a plurality of subscribers. These subscribers may order programs by signaling to the system which program they want, and may stop, pause, fast forward, rewind or change the program via the same signaling channels. In response to subscriber requests, interactive video server 10 directly accesses long-term memory units and provides digitally encoded video to a subscriber network for transport to its destination.

In the interactive video server 10 of the exemplary embodiment of this invention, there are a plurality of order processors represented by 12, 14, and 16, which receive subscriber signaling and return confirmation or other data to the subscriber. Order processors 12, 14, and 16 determine the storage location of the requested program and the destination address of the subscriber and sends that data on a local area network (LAN) 18. In this exemplary embodiment, LAN 18 is is an Ethernet LAN, as is well known in the art. LAN 18 provides communication among order processors 12, 14 and 16, and a plurality of content storage units, represented by content storage unit 20.

Order processors 12, 14, and 16 may be computers with CPUs, main memory and I/O devices are as is known in the art. Alternatively, order processors 12, 14, and 16 may be input/output devices for receiving signaling and are part of a larger, distributed computer. In this case, there would also be a CPU (not shown) connected to LAN 18. A main memory unit (not shown) may be connected to the CPU, or to LAN 18. Content storage unit 20 is separate and distinct from these other units and operates independently from order processors 12, 14, and 16, and any other computer on LAN 18.

Content storage unit 20 provides access of long-term memory units represented by disks 22 and 24, which store packetized audio and video signals conforming to the motion picture experts group (MPEG-2) standard, according to this exemplary embodiment. Content storage unit 20 delivers such data to a plurality of network links represented by 26, 28, and 30. These links may connect content storage unit 20 to other units, to a network, or to individual subscribers.

Content storage unit 20 comprises a controller 30 which is connected to LAN 18 and, thus, is in communication with order processors 12, 14, and 16. Controller 32 administers the request for video service received from LAN 18 and configures storage device adapter 38, buffer 36, and network interface 38 to deliver data from storage devices 22, 24, to network links 26–30. As will be explained further below in connection with FIG. 2, storage device adapter 34 causes access of storage devices 22, 24, and moves data retrieved from the storage devices into buffer 36. Network interface 38 removes data stored in buffer 36 according to an algorithm described below in connection with FIG. 3 and delivers the data to network links 26, 28, and 30.

As orders arrive at order processors, for example, order processor 12, it performs a lookup in a database (not shown) to determine which of the plurality of content storage units 20 is associated with the desired programmatic material. Order processor 12 then puts an identification of the desired programmatic material and the destination address of the subscriber into a message and sends it on LAN 18 to the appropriate content storage unit, in this example, content storage unit 20. Controller 32 in content storage unit 20 receives the program request and determines which of the plurality of storage devices 22–24 holds the program. Controller 32 then sets up a channel for the program in order to route the programmatic material through content storage unit 20 to a network link, for example, 28. The program data is then read from a device, for example 22, into buffer 36. Network interface 38 then removes the data from buffer 36, formats the data for transmission on network link 28 and sends the data onto the network link.

Additionally, order processor 12 may receive commands to stop, pause, fast-forward or rewind the program. Order processor 12 places these commands into a message and sends the message on LAN 18, which message is then received by controller 32. Controller 32 updates its table and causes the content storage unit to take the appropriate action.

Figure 2:
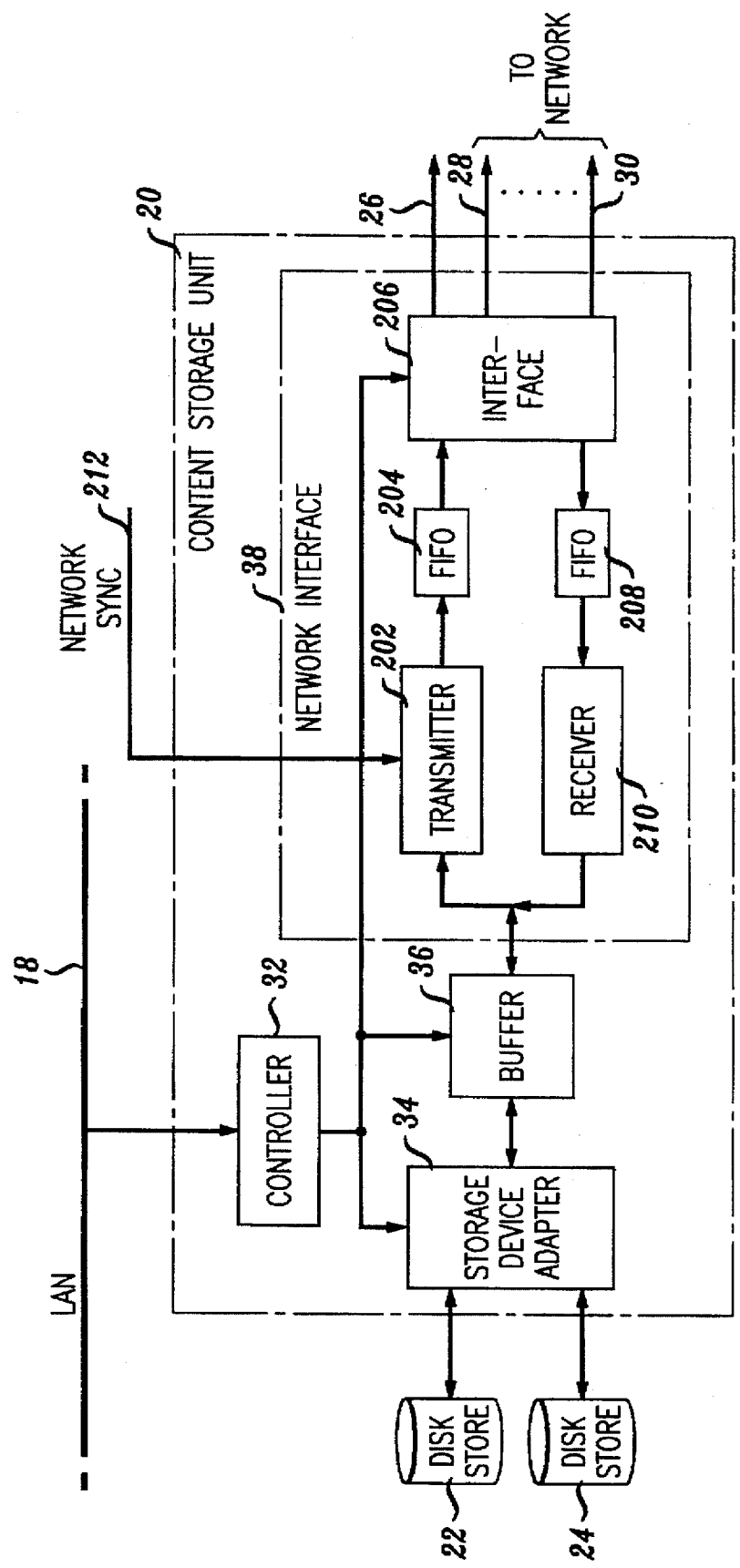
FIG. 2 is a block diagram of a content storage unit of FIG. 1 according to an exemplary embodiment of this invention.

Turning now to FIG. 2, a content storage unit 20 (from FIG. 1) is shown. As stated above, content storage unit 20 generally comprises a controller 32 connected to a LAN 18 from which it receives commands. Controller 32 causes storage device adapter 34 to access one of a plurality of connected storage devices, represented by 22, 24, and delivers the data to a buffer 36. Storage devices 22 and 24 are shown as magnetic disk systems but may be any form of storage device, such as CD ROM, 8 mm DAT or 4 mm DAT. In this exemplary embodiment of this invention, the connections between storage device adapter 34 and storage devices 22, 24 are SCSI two-way links, so that data may be delivered from the storage devices 22, 24 to storage device adapter 34, or from storage device adapter 34 to storage devices 22, 24. This transfer of data to storage devices 22, 24 may be desirable if, for example, a storage medium is being loaded with programmatic material (or data) from another content storage unit. This is useful, for example, when multiple copies of a popular movie are needed.

As stated above, controller 32 sets up a channel for each program being read from storage devices 22, 24 and delivered to network links 26–30. For each channel, there is one or more locations in buffer memory 36 to which the data for a specific program is delivered. As data is moved into buffer memory 36 for one channel, other data may be removed by network interface 38 for another channel. Network interface 38 removes data from buffer memory 36, formats it, and sends it on to the appropriate channel in network link 26–30. Network links 26, 28, 30 are illustrative of the connection to the network. If the bandwidth of one of the network links 26, 28, or 30 is greater than or equal to the total bandwidth of network interface 38, then only one multiplexed network link is required.

In the exemplary embodiment of this invention, data is stored in MPEG-2 transport stream packets which comprise 188 bytes of data each. As is known in the art, an ATM cell comprises a header which includes a destination address, and a 48 byte payload. According to the MPEG-2 standard, 47 bytes of an MPEG-2 transport stream packet is loaded into each ATM payload. The 48th byte is an ATM adaption layer (AAL) header, which keeps track of the sequence of MPEG-2 transport stream packet portions in the ATM cells.

Buffer 36 receives MPEG-2 packets from storage adaptor 34 and network interface reads 47 byte portions from buffer 36 and encapsulates them into an ATM cell for transmission on channels 26–30. Transmitter 202 adds the ATM header information comprising the destination address of the specific subscriber, as received from controller 32. Transmitter 202 sends the ATM packet to a FIFO 204. FIFO 204 acts as an adaption buffer for packet transmission. FIFO 204 delivers the ATM cells to an interface 206 which then delivers the ATM cell to a destination network link 26–30.

Network interface 38 may also receive data from network links 26–30. Interface 206 receives data and sends it to a FIFO 208 (adaption buffer) for processing by receiver 210. Receiver 210 removes an ATM cell from FIFO 208, strips off the ATM header, and delivers it into buffer memory 36 according to the specific channel. Storage device adapter 34 then reads that particular channel from buffer memory 36 and delivers the content of buffer memory 36 to the appropriate storage device.

Transmitter 202 receives a network sync pulse 212 from a network clock source, which may have a stratum 1 accuracy. Transmitter 202 uses network sync 212 in order to coordinate its activities, as will be described next.

Figure 3:
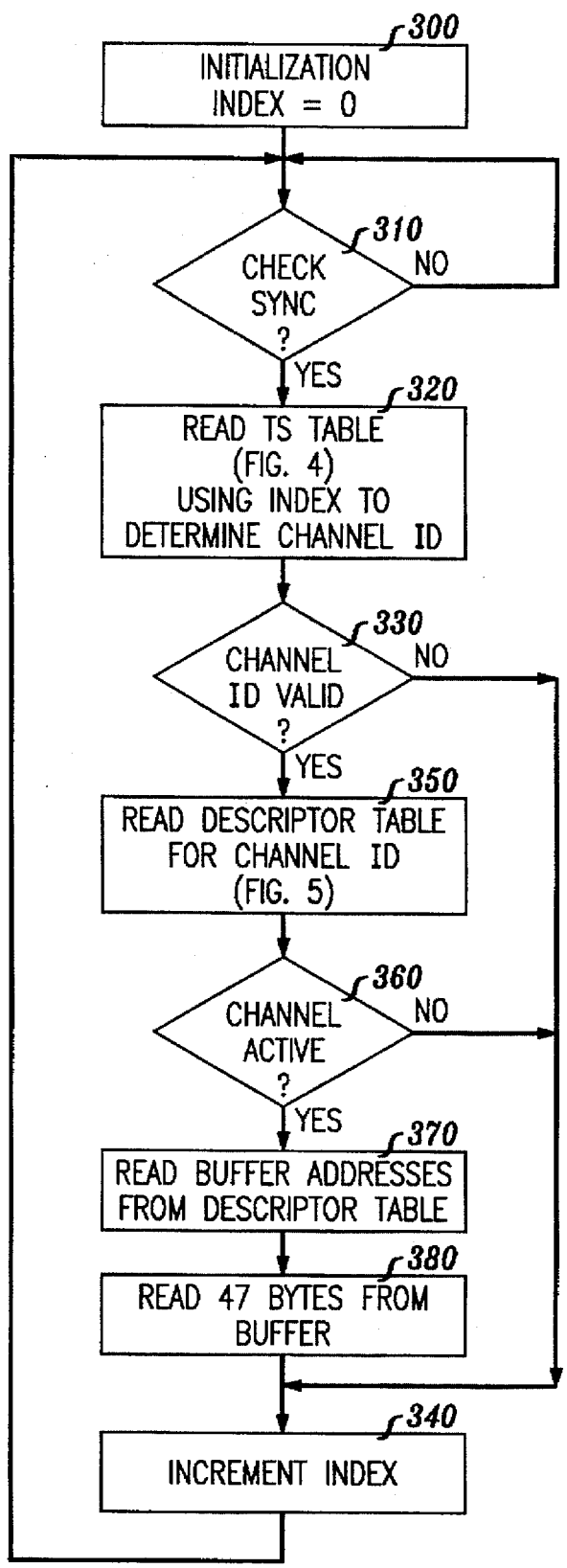
FIG. 3 is a flow chart of the operation of the content storage unit of FIG. 2.

Turning now to FIG. 3, a flow chart describing the operation of controller 32 is shown. Processing starts at action box 300 where the controller is initialized and an index used for accessing a timeslot table (FIG. 4) is initialized to zero. Processing continues to decision diamond 300 where a check is made if a clock sync has been received. If a clock sync has not been received, then processing waits at decision diamond 310. When a clock sync has been received in decision diamond 310, then processing proceeds to action box 320 where a timeslot table is read using the index value to determine if a channel needs to be serviced.

Turning to FIG. 4, a timeslot table, as used in controller 32 is shown. One of the goals of content storage unit 20 is to support multiple bandwidth rates, wherein each channel may have its own bandwidth requirement. The exemplary embodiment of this invention uses a timeslot table wherein each table entry may have a channel ID (or a null entry) in it. Controller 32 traverses the table entries sequentially and, for each valid channel ID found, moves 47 bytes of data for that channel from buffer 36 into network interface 38, adds the ATM header information, and permits the cell to be transferred into the ATM network. In this manner, greater bandwidth may be allocated by populating the table with multiple entries for a specific channel. Each channel is guaranteed at least one entry in the table. The granularity of the bandwidth is, therefore, the number of entries in the table.

The table, according to FIG. 4, is derived as follows. Assuming a sync signal 212 having a period f, a clock frequency is derived from the network sync signal which corresponds to an integral number of clock periods necessary to transport the channel (47 bytes of the MPEG-2 transport stream packet can be encapsulated into an ATM cell and transmitted in one clock period). Thus, four such clock periods are required to transport a complete 188 byte MPEG-2 transport stream packet. t is the period of this clock frequency, wherein f/t is an integer. C is the bandwidth capability of the network interface. For an ATM output of a SONET STS-3C port, the available bandwidth is approximately 132 Mbps. A super frame interval, F is selected to represent the amount of time required to traverse the entire table. A number P of timeslots is in the superframe such that F=P*t. r is the minimum bandwidth of a video channel going to the output port such that P*r≤C. If n is the number of distinct video channels, each with a different rate $r_i$ going to the output port, then the following condition should then hold true:

$$\sum_{i=1}^{n} (r_i) \leq C.$$

Each rate $r_i$ is an integral multiple of rate r. For the preferred embodiment of this invention, P should be large and F should be an integral multiple of small f. r will equal C/P, which is very small.

If the minimum bandwidth is desired to be very small, then, if f (clock period or sync) equals 125 microseconds, and C (bandwidth capacity of ATM output port) equals 132.352 Mb/s (a SONET STS-3C port), then f/t=44, and t=2.841 msec. If P=5000 (5000 entries in table), then F (time period for one traversal of the table)=P*t (time used by one entry), which equals 5000×2.841=14.205 msec, and r (bandwidth resolution)=C/P=132.352/5000=26.47 bps.

Otherwise, in order to maximize throughput, F=f=125 μ sec. 47 bytes in 125 msec will yield a rate of 3.008 Mbps. If this rate is r, then $$t = \frac{1}{r} = 2.841 \mu sec.$$

Therefore, $$P = \frac{F}{t} = 125/2.841 = 44$$

entries in the table.

Returning to FIG. 3, processing continues from action box 320 to decision diamond 330, wherein the channel ID found in the timeslot table is checked for validity. If the channel ID is not valid, that is, out of the range of usable channel IDs, then processing continues to action box 340 where the index is incremented and processing returns to the top of the loop to decision diamond 310, where processing waits for the next clock sync.

If, in decision diamond 330, the channel ID from table 400 is found to be valid, then processing continues to action block 350 where a descriptor table is read using the channel ID as an index. A typical descriptor table is shown in FIG. 5. A first determination is made if the channel is active in box 360. In the example of FIG. 5, the channel status is "active" for channel 1. If a channel is not active, for example channel 2 is "pause," channel 5 is "stop," then a determination may optionally be made if the ATM adaptation layer (AAL) sequence count is zero. AAL sequence count keeps track of how many ATM cells have been sent for each MPEG-2 transportation packet. Since it takes four ATM packets to transport one MPEG-2 transport stream packet, this system must keep track of whether an entire MPEG-2 packet has been sent. This is important, for example, if the subscriber "stops" or "pauses" the MPEG-2 packet can be completed to prevent synchronization problems when the stream is restarted.

For channel 2 the AAL sequence count is, in fact, zero. Therefore, there is nothing further to do and processing continues to box 340 where the index is incremented and returns to wait for network sync in decision diamond 310. If the AAL sequence count is not zero, as for example channel 5 where it is 1, then processing must complete sending the AAL sequence. Processing continues for this channel until the AAL sequence count is back to zero (that is, all four ATM packets containing the MPEG-2 transport stream packet have been sent and the AAL sequence count returns to zero).

Further checks may also optionally be made of the channel type and buffer status fields. The buffer status may be "full" (data to be transported), "empty" (no data to be transported), "storage device" (storage device is writing into buffer), or "ATM" (buffer is being read by transmitter). Transmitter 202 should generally see "full" in this field and then change the status to "ATM." If the status is "empty," an error condition may be present. The channel type field is then consulted. If the channel type is "constant" then there should be dam in the buffer because it is being read at a constant rate. An error is, therefore, present. If the channel type is "variable" then a status of "empty" merely means that there is not data to be read at this time, and this channel can be skipped.

If the channel status is active (or the AAL sequence count is non-zero), as determined in decision diamond 360, then processing continues to action box 370 where the starting and ending buffer address are read. These values are compared to ensure that reading 47 bytes will not cause the read operation to go beyond the ending address. (As data is moved into buffer 36 the ending address is incremented to reflect more data in the buffer). Processing then continues to box 380 where 47 bytes (payload of 1 ATM cell) is read from buffer 36 into transmitter 202 and the read pointers updated. Transmitter 202 then adds the ATM destination header for the particular channel and places the complete ATM cell into FIFO 204, which waits for its next transmit through interface 206.

Processing continues to action box 340 where the index is incremented and checked for range. If the index is out of the range of usable timeslots, then it is set back to the first entry and processing returns back to decision diamond 310 where processing waits for the next clock sync.

It is to be understood that the above-described embodiment is merely illustrative principles of the invention and that many variations may be devised by those skilled in the art without departing from the scope of the invention. For example, this system may be used to transfer data from one computer system to another. No CPU cycles are used by either system, thus improving the efficiency of such transfers. It is, therefore, intended that such variations be included within the scope of the claims.

I claim:

1. An apparatus for retrieving data from a plurality of long-term memory devices and delivering said data to a packet network, said apparatus supporting a plurality of channels of said data, each of said channels having a predetermined bandwidth requirement, said apparatus comprising:

controller means for selecting one of said plurality of channels, wherein the frequency of said channel selection is controlled so that the predetermined bandwidth requirement of said selected channel is met;

storage device adapter means connected to said plurality of long-term memory devices for reading data from a selected one of said plurality of long-term memory devices for each of said plurality of channels independent of said controller means;

buffer memory means connected to said storage device adapter means for storing data, said buffer memory means having a plurality of locations, said buffer memory means receiving said data from said storage device adapter means and storing said data in one of said plurality of locations, said one location being associated with one of said plurality of channels; and network interface means connected to said controller means and to said buffer memory means for reading data from said buffer memory means and delivering said data to said packet network responsive to said controller means said controller means including a table having a plurality of entries and said controller means having means for selecting an entry in said table, wherein each of said channels has at least one entry in said table, and channels requiring greater bandwidth have multiple entries in said table so that said channels requiring greater bandwidth are selected multiple times for each traversal of said table by said controller means.

2. An apparatus according to claim 1 wherein said packet network comprises an asynchronous transfer mode network and data is transferred in asynchronous transfer mode cells, said asynchronous transfer mode cells having a header and a payload, wherein said network interface means includes means for reading a portion of said data in said buffer memory equal to the size of said asynchronous transfer mode cell payload into an asynchronous transfer mode cell, and means for adding an asynchronous transfer mode header to said asynchronous transfer mode cell.

3. An apparatus for providing video-on-demand which receives subscriber signaling and delivers data representing said programmatic material over a packet network to said subscriber responsive to said subscriber signaling, said apparatus comprising:

one or more content storage means responsive to said subscriber signaling for reading data from long-term memory devices, for formatting said data for transport over said packet network, and for sending said data over said packet network, said content storage means comprising:

a storage unit adapter, a buffer and a network interface, said storage unit adapter connected to said buffer for reading said data from said long-term memory unit into said buffer, and said network interface connected to said buffer for reading data from said buffer, for adding an address usable by said packet network and for sending said data with said added address on said packet network, and a controller means for selecting said selected channel from said plurality of channels, wherein said controller means includes a table having a plurality of entries, each of said channels having at least one entry in said table, said controller means having means for selecting one of said plurality of entries in said table, wherein channels requiring greater bandwidth have multiple entries in said table so that said channels requiring greater bandwidth are selected multiple times for each traversal of said table by said controller means.

4. An apparatus according to claim 3 wherein said apparatus supports a plurality of channels of said data, and said storage unit adapter, buffer and network interface are responsive to a selected channel for moving data from said long-term memory devices, through said storage unit adapter, said buffer and said network interface to said packet network.

* * * * *